Figure 3:
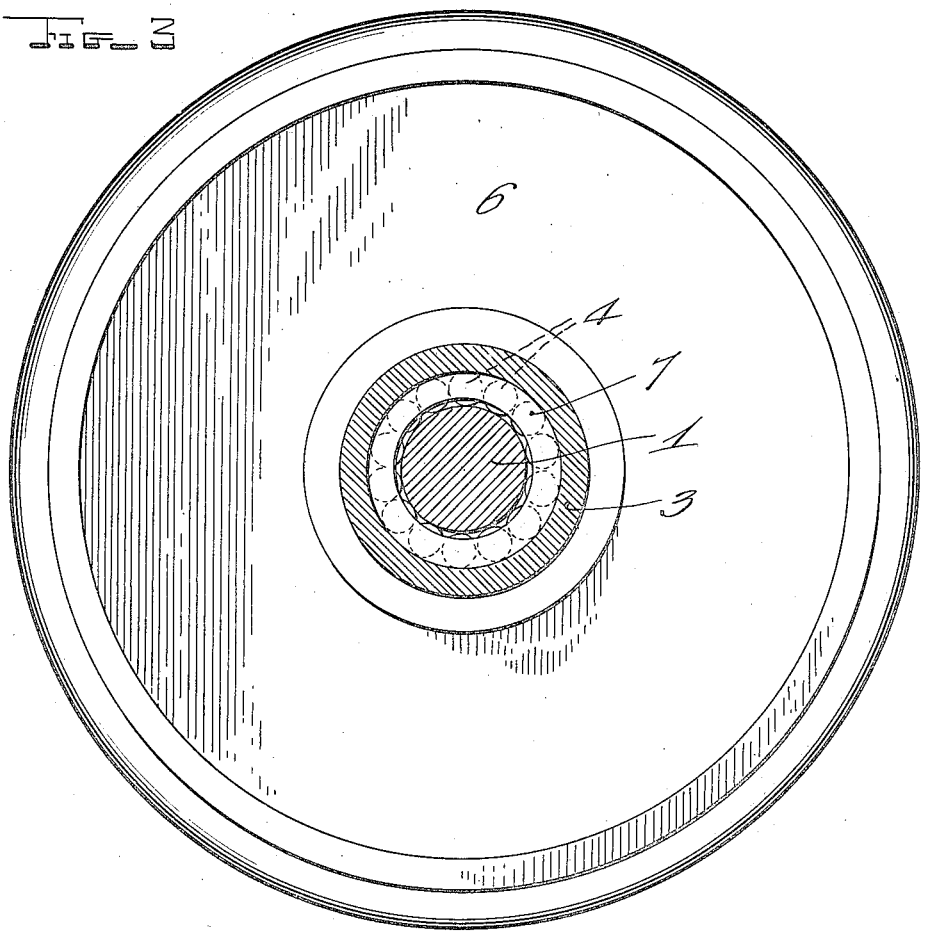

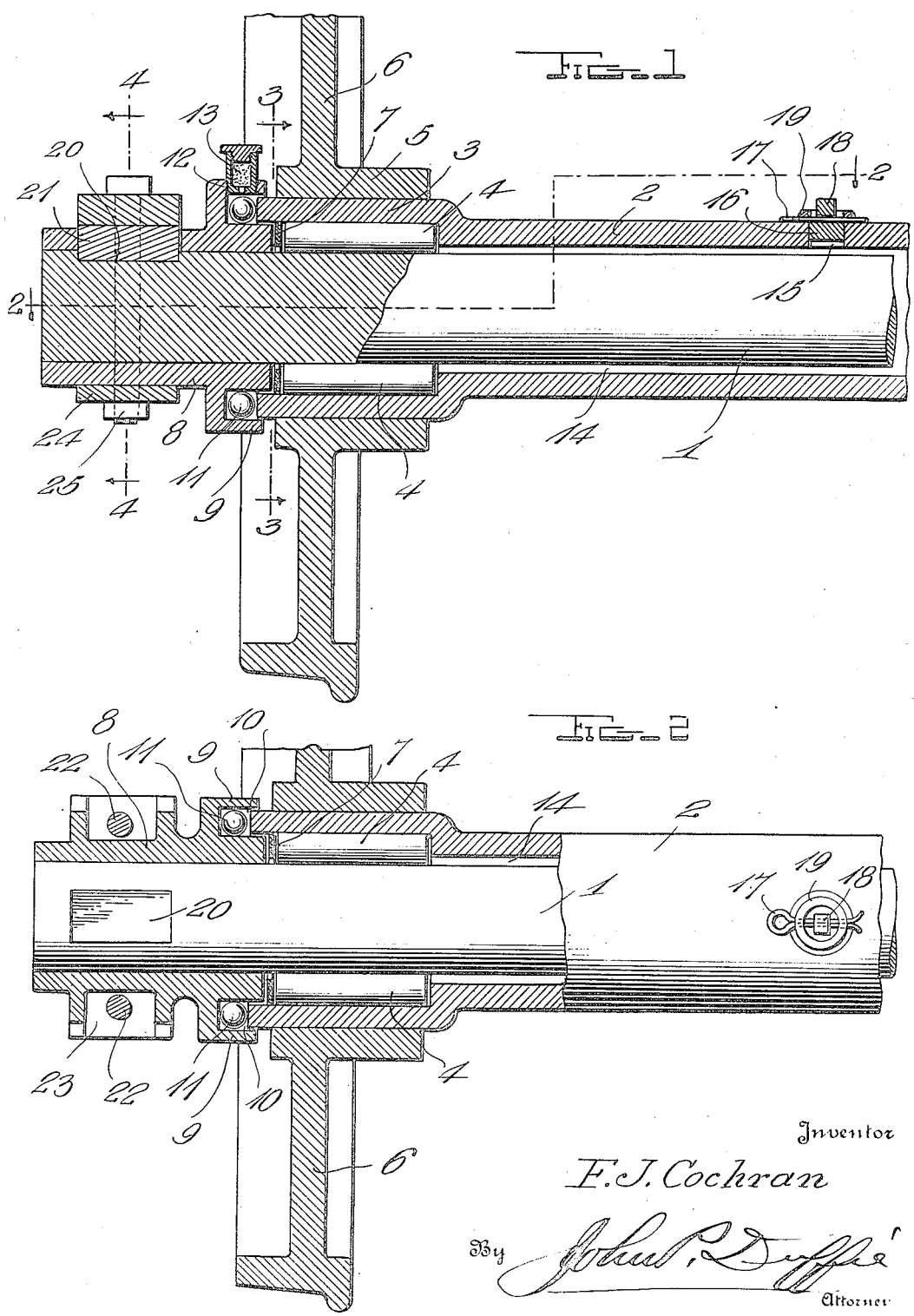

F. J. COCHRAN.
BALL BEARING AXLE.
APPLICATION FILED JULY 12, 1916.

1,210,422.

Patented Jan. 2, 1917.
2 SHEETS—SHEET 2.

Inventor
F. J. Cochran
By
Attorney

UNITED STATES PATENT OFFICE.

FRED J. COCHRAN, OF MOUNT VERNON, ILLINOIS.

BALL-BEARING AXLE.

1,210,422.  Specification of Letters Patent.  Patented Jan. 2, 1917.

Application filed July 12, 1916. Serial No. 108,807.

*To all whom it may concern:*

Be it known that I, FRED J. COCHRAN, a citizen of the United States, residing at Mount Vernon, in the county of Jefferson and State of Illinois, have invented certain new and useful Improvements in Ball-Bearing Axles, of which the following is a specification.

This invention relates to new and useful improvements in a ball bearing axle for cars of any character, such as street cars, railway cars, mining cars, etc.

The primary object of this invention is to provide a ball bearing axle or journal for the wheels in which there is a roller or ball bearing engagement between all contacting points, thus reducing friction to the minimum, and which will obviate all danger of the wheels of the car trucks leaving the rails on account of lateral displacement of the wheels.

With the foregoing and other objects in view that will appear as the nature of the invention is better understood, the same consists in the novel features of construction, combination and arrangement of parts illustrated in the drawings and more particularly pointed out in the appended claims.

Figure 4:
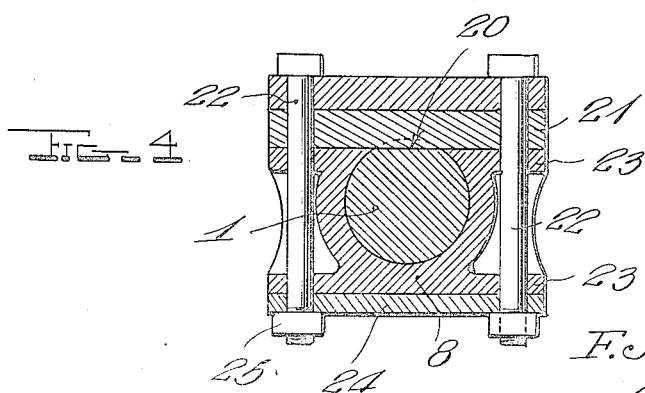

In the accompanying drawings:—Figure 1 is a vertical longitudinal section of a ball and roller bearing axle embodying my improvements. Fig. 2 is a horizontal section, taken on line 2—2 of Fig. 1. Fig. 3 is a vertical transverse section, taken on line 3—3 of Fig. 1, looking in the direction indicated by the arrows, and Fig. 4 is a vertical transverse section taken on line 4—4 of Fig. 1, looking in the opposite direction.

Referring to the drawings for a more particular description of the invention and which drawings are for illustrative purposes only and are therefore not drawn to scale, the bearing axle comprises the solid cylindrical stationary shaft or axle 1 of cold rolled steel or iron, on which is revolubly mounted a hollow cylindrical sleeve 2, provided at each end with a cylindrical enlargement 3. Within the enlargement at each end of the sleeve 2 is arranged a continuous circular series of bearing rollers 4, which extend longitudinally of the shaft and sleeve and work or travel around the former. The cylindrical enlargements 3 of the sleeve are of somewhat greater length than that of the bearing rollers, as shown, and project somewhat beyond the outer ends of the hubs 5 of the wheels 6, which are pressed or keyed to the enlargements in the usual way.

Arranged within the outer end of each enlargement 3 of the sleeve adjacent the outer ends of the corresponding series of bearing rollers 4, is an annular ring or member 7 of vulcanized fiber, leather or raw hide which acts as a dust guard, the inside or smaller diameter of said rings or members being greater than that of the shaft or axle 1 to prevent contact therewith and thus eliminate friction.

A hollow cylindrical cap 8 preferably of cast steel, fits on each end of the shaft or axle 1 with its inner end projecting slightly into the outer end of the adjacent enlargement 3 of the sleeve. The inner end of each cap is provided with an annular flange 9 which surrounds the same and projects somewhat over or overlaps the outer end of the adjacent enlargement 3 of the sleeve, said annular flange forming a circular ball race 10 in which is arranged a continuous circular series of bearing balls 11 which are applied or inserted in place through a vertical opening 12 in the flange 9 which is interiorly threaded to receive a grease cup 13 of any suitable design.

The annular space 14 between the shaft or axle 1 and the sleeve 2 is filled with grease which may be replenished at any time necessary through a transverse opening 15 in the sleeve normally closed by a plug 16 held in place by a cotter pin 17 inserted through the neck or reduced portion 18 of the plug or stopper and an annular boss 19 cast on the outer surface of the sleeve 2 around said opening.

The shaft or axle 1 is provided in its top at each end with a central longitudinal recess 20 to receive the arch bars 21 which extend across the top of the axle or shaft and are of such form or construction as shall be required to carry the frame of the truck. The caps 8 are held in place on the shaft or axle 1 by the vertical fastening bolts 22 which extend through the arch bars 21, the horizontal lateral flanges or extensions 23 of the caps and the base plates 24 which fit against the bottom of the caps and by the nuts 25 which screw on the lower threaded end of the bolts against the bottom faces of said base plates.

The two series of ball bearings above mentioned are to take care of the side motions occasioned by the car in swaying back and forth and especially in rounding curves, and it will be observed that there is no contact between the caps and the sleeve except where the ball bearings engage the ends of the latter, while the weight of the car is borne by the bottom of the axle around which the bearing rollers 4 work, thus reducing friction between the stationary and movable parts to the minimum. Attention is also invited to the fact that by rigidly mounting the car wheels on the outer revoluble member or sleeve, all liability of the car trucks leaving the track because of lateral movement or displacement of the wheels, is obviated.

From the foregoing description taken in connection with the drawings, it is thought that the construction, operation and advantages of this invention will be readily understood without requiring a more extended explanation.

Various changes in the form, proportions and minor details of construction may be resorted to without departing from the principles or sacrificing any of the advantages of this invention as defined in the appended claims.

Having described the invention, what is claimed as new and desired to secure by Letters Patent, is:—

1. A ball and roller bearing axle of the character specified comprising an inner stationary shaft, a hollow sleeve revolubly mounted thereon and provided at opposite ends with cylindrical enlargements, a circular series of bearing rollers arranged in the enlargement at each end of the sleeve, around said shaft, hollow caps mounted on opposite ends of the shaft and provided at their inner ends with annular ball races partly receiving the ends of the sleeve and bearing balls arranged in said ball races against the ends of the sleeve, for the purpose specified.

2. A ball and roller bearing axle of the character specified comprising an inner stationary shaft, a hollow sleeve revolubly mounted thereon, said sleeve provided at opposite ends with cylindrical enlargements, a circular series of bearing rollers arranged in the enlargement at each end of the sleeve around the shaft, hollow caps mounted on opposite ends of the shaft and provided at their inner ends with annular ball races partly receiving the ends of said sleeve, bearing balls arranged in said ball races against the ends of the sleeve and an annular ring or member, constituting a dust guard, arranged in the enlargement at each end of the sleeve adjacent the outer ends of the adjacent series of bearing rollers, the inside diameters of said annular rings and the revoluble sleeve being greater than that of the shaft.

3. A ball and roller bearing axle of the character specified comprising an inner stationary shaft, a hollow sleeve revolubly mounted thereon, said sleeve provided at opposite ends with cylindrical enlargements, a circular series of bearing rollers arranged in the enlargement at each end of the sleeve around the shaft, hollow caps mounted on opposite ends of the shaft and provided at their inner ends with annular ball races partly receiving the ends of the sleeve, bearing balls arranged in said ball races against the ends of the sleeve, and means provided whereby a lubricant may be introduced through the sleeve into the annular space between the shaft and the latter.

4. A ball and roller bearing axle of the character specified, comprising a stationary shaft provided at each end in its top with a central longitudinal recess, a sleeve revolubly mounted on said shaft, bearing rollers between the ends of the sleeve and the shaft, caps on the ends of the shaft partially receiving the ends of the sleeve, bearing balls between the ends of the sleeve and the caps, upper and lower horizontal wings cast with and extending laterally of said caps, arch bars extending across the top of the shaft and fitting in the recesses thereof, base plates fitting against the bottoms of the caps, fastening bolts passing vertically through the arch bars, the wings of the caps and the base plates and nuts screwing on said bolts against the bottom of the base plates.

In testimony whereof I affix my signature in the presence of two witnesses.

FRED J. COCHRAN.

Witnesses:
  HELEN WEBB,
  ROGER G. WEBB.